Nov. 29, 1927.  
E. L. McCAIN  
1,651,141  
KNIFE  
Filed Nov. 19, 1924
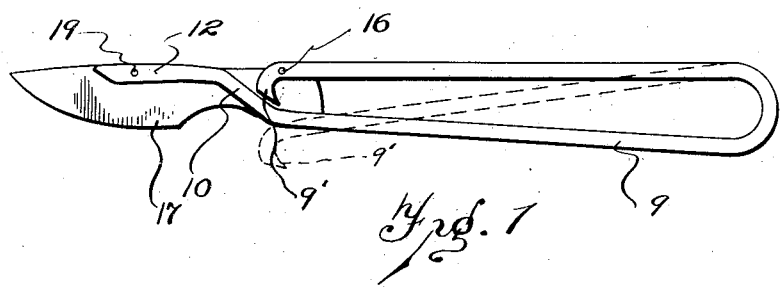
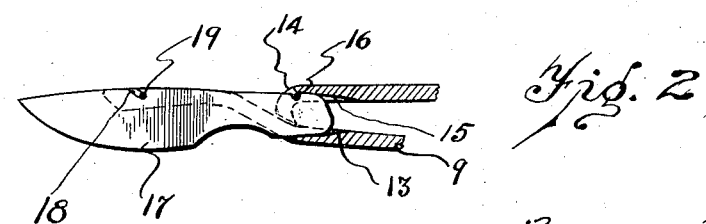
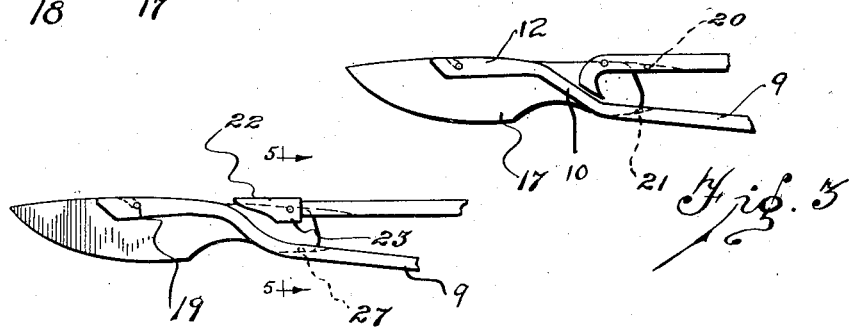
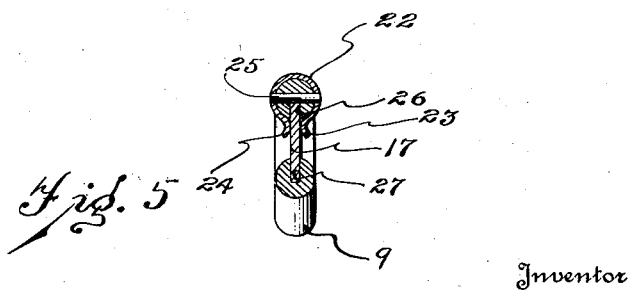
Inventor  
ELLSWORTH L. McCAIN  
By Thos. L. Donnelly  
Attorney Patented Nov. 29, 1927.

1,651,141

UNITED STATES PATENT OFFICE.

ELLSWORTH L. McCAIN, OF DETROIT, MICHIGAN.

KNIFE.

Application filed November 19, 1924. Serial No. 750,770.

My invention relates to a new and useful improvement in a knife, in which a detachable blade is used with a specially constructed handle, so that the blade may be readily detached from the handle for replacement with a new blade when desired, and so arranged that the blade may be easily and quickly mounted on the handle, held in rigid position when mounted on the handle. With knives of this class, in which a detachable blade is used, difficulties are encountered which render the knife less efficient for the uses to which it is adapted. A surgeon, when using a knife of this class, generally is wearing rubber gloves which may be easily perforated or torn in removing or replacing a blade. Consequently, it is desirable that the handle be so constructed that the blade may be attached to the handle, or removed therefrom, with a minimum of operations and in such a way that the likelihood of the surgeon perforating the rubber gloves which he is wearing shall be reduced to a minimum.

Another difficulty encountered in the using of a detachable blade on a knife handle of this class is a loose mounting of the blade on the handle, so that the blade is not held firm and fixedly, relatively to the handle, but is permitted to sway or move slightly on its mountings. For the most efficient results in the use of a knife of this class, it is desirable that there be no relative play between the knife and the handle.

The present invention is designed to overcome these difficulties and to provide a handle in which the blade will be easily and quickly mounted and easily and quickly locked firmly in fixed relative position to the handle, with a movement of a minimum number of parts.

Another feature of the invention is the provision of a handle so constructed as to present a pair of resilient members adapted for engaging the knife blade between them and clamping the same firmly in operative position. Another object of the invention is the provision of a knife of this class which may be simple in structure, economical of manufacture, and highly efficient in use.

The invention consists of the combination and arrangement of parts hereinafter described and claimed.

The invention will be best understood by a reference to the accompanying drawings which form a part of this specification, and in which;

Fig. 1 is a side elevational view of invention.

Fig. 2 is a fragmentary, longitudinal, vertical, sectional view of the handle, showing the blades in side elevation.

Fig. 3 is a fragmentary side elevational view of a modified form of the invention.

Fig. 4 is a fragmentary side elevational view of a further modified form of the invention, and, Fig. 5 is a sectional view, taken on substantially line 5—5 of Fig. 4.

In the preferred form, the knife handle 9 is formed from a single piece of wire, doubled upon itself, and having one of the ends angularly turned, as at 10, terminating in a further angularly turned portion 12, which extends mainly in alinement with the upper portion of the handle. The upper portion of the handle is angularly turned as at 9'. The material from which the handle is made is sufficiently resilient so that when the two portions of the doubled over wire are spread apart, the resiliency of the material will tend to restore the member to normal position. When the portions of the handle are positioned over each other, as shown in Fig. 1, and the blade 17, which is used therewith, is removed therefrom, the angularly turned portion 9' will rest against the angularly turned portion 10, in close engagement therewith. When the blade 17 is removed, should the doubled over portion of the handle 9 be relatively displaced laterally, the doubled over portion will spring to crossed position, so that when the doubled over portions of the handle 9 are raised to the position shown in Fig. 1, there is considerable tension tending to move the handle portions into closer relation with each other. The lower portion of the handle 9, at the free end, is bifurcated, the bifurcation being secured together, adjacent the free ends, by a suitable pin or rivet 19. A detachable blade 17, is adapted for insertion between the bifurcation of the lower portion of the handle 9. The blade is provided in its upper edge, with a rearwardly inclined slot 18, adapted for reception of the pin 19. In forming the free end of the lower portion of the handle bifurcated, the slotting is carried rearwardly, to the main portion of the lower portion of the handle 9, so as to provide a shoulder or resting surface 13, adapted for engaging with the lower edge of the shank of the blade 17. The angularly turned portion 9' is also bifurcated, as shown in Fig. 2, and the slotting of this angularly turned end is carried rearwardly into the main body of the upper portion of the knife handle 9, to provide a shoulder or resting place 15, adapted for engagement with the upper edge of the shoulder of the blade 17. The bifurcation of these ends is so carried on that the resting shoulders 13 and 15 are substantially the bases of grooves formed in the main body of the opposite ends of the handle 9.

In mounting, the blade 17, in operative position on the handle 9, the blade is inserted between the bifurcations, so as to bring the pin 19 into engagement with the slot 18. The blade is then positioned in engagement with the shoulder 13, the upper portion of the handle having first been flexed upwardly, to permit the assembly of the blade in this position. As shown in Fig. 2, the blade is provided in the upper edge of its shank, with a notch or recess 14. A pin or rivet 16, is projected through the bifurcation of the angularly turned portion 9' and when the knife is mounted in the position shown in Fig. 2, with the pin 19 engaging the base of the slot 18, a lowering of the upper portion of the handle 9, upon the shank of the blade 17, so that the bifurcations of the angularly turned portion 9' shall embrace the blade 17, at opposite sides, the pin 16 will engage in the notch 14. The pin 19 will prevent a forward movement of the blade relatively, to the handle 9, the pin 16 engaging in the notch 14 and preventing a rearward movement of the blade 17, relatively to the handle 9. Although I have shown in the drawings, the use of the pin 16, the same may be dispensed with, if desired, as the pressure of the handle portions, against the shank of the blade, will serve to bind the blade in fixed relation, sufficiently tight to resist such normal thrusts and pressure as may be exerted upon it.

In Fig. 3, I have shown a modified form of the invention, wherein the portions of the handle 9 are provided with arcuate grooves, 20 and 21, the end of the shank of the blade 17 being curved. This form of the shank of the blade, and the grooves, is made for facilitating the mounting of the blade in the handle. The blade in this instance may be inserted between the bifurcations, having rearward thrusts exerted upon the blade sufficiently to carry it rearwardly, so as to spread the doubled over portion of the handle apart, to permit the seating of the shank of the blade in the grooves 20 and 21. A forward movement of the blade will then bring the pin 19 into engagement with the body of the slot 18 and permit the pin 16 to engage in the notch 14.

In Fig. 4, I have shown a further modified form in which the upper portion of the handle 9 is not angularly turned downwardly, toward the bottom portion, as shown in the other forms. A hood 22, formed from suitable material, is mounted on the end of the upper portion of the handle 9 in fixed relation, by either welding or in any other desired manner. This portion of the handle is bifurcated to provide a groove 26, as shown in Fig. 5. The pin 25 is projected through the handle portion and through the shield 22, so as to lie in the groove 26. The downwardly projecting sides, 23 and 24, are adapted for engaging at opposite sides, the blade 17. A groove 27 is also formed in the bifurcated lower end of the handle 9. The structure of the blade is, as already described, the pins 19 and 26 performing the functions mentioned.

It is thus seen that I have produced a handle for mounting a blade detachably, thereon, which is simple in structure, and easily operated. Furthermore, the structure of the handle renders the device a desirable one for sanitary reasons, as the handle itself may be easily and quickly sterilized, the structure of the handle presenting a minimum of surface for the clinging of germs or other infecting material.

When it is desired to remove the blade, the upper portion of the handle may be lifted out of engagement with the blade 17 and laterally displaced, relatively to the lower portion. The blade may then be easily thrust rearwardly, so as to disengage the pin 19 from the slot 18. The knife is adapted for various uses, and especially lends itself for use in surgical work. This movement of the blade may be done by the surgeon, while he is wearing the rubber gloves, without in any wise bringing the gloves into contact with a surface, which might puncture them.

While I have illustrated and described the preferred form of structure, I do not wish to limit myself to the precise details of structure shown, but desire to avail myself of such variations and modifications as come within the scope of the appended claims.

Having thus described my invention, what I claim as new and desire to secure by Letters Patent, is:

1. A knife handle of the class described, adapted for use with a detachable blade and comprising a resilient member doubled upon itself, the ends thereof being adapted for springing apart for receiving and clamping between them said blade, one of said ends being extended along said blade the major portion of its length for reinforcing the same and angularly turned to project across the medial line of said blade at a point between the handle and the extremity of said end.

2. A knife handle of the class described, adapted for use with a detachable blade and comprising a resilient member doubled upon itself, the ends thereof being adapted for springing apart for receiving and clamping between them said blade, one of said ends engaging one edge of said blade adjacent one end thereof and being extended along said blade at the opposite edge thereof throughout the major portion of its length for reinforcing the same.

3. A device of the class described, comprising a knife handle having a pair of relatively movable normally resilient clamping members, one of said members being extended beyond the other; an engaging member mounted on said extended member, said extended member having an engaging surface formed thereon; a detachable blade having a notch formed in its upper edge for the reception of said engaging member, the butt end of said blade being adapted for engaging said engaging surface, said blade being movable in its plane on said engagement member as a pivot in one direction after engagement of said butt with said engaging surface and said engagement member in said notch, the other of said clamping members engaging the upper edge of the butt of said blade for preventing said planal movement.

4. A knife handle of the class described, adapted for use with a detachable blade, comprising a resilient member, doubled upon itself, the ends thereof being adapted normally to move into close relative approach, one of said ends being adapted for engaging at the opposite longitudinal edges of said blade and the other of said ends being adapted for engaging one of the longitudinal edges of said blade.

5. A knife handle of the class described, adapted for use with a detachable blade, comprising a pair of resilient members adapted for being sprung apart for receiving and clamping between the same said blade, one of said members engaging opposite longitudinal edges of said blade and the other of said members engaging one of said longitudinal edges.

6. A knife handle of the class described, adapted for use with a detachable blade, comprising a pair of resilient members, adapted for being sprung apart for engaging and clamping between them said blade, one of said members engaging one of the longitudinal edges of said blade adjacent one end thereof and carrying means for engaging the opposite longitudinal edge at one side of the medial point thereof, the other of said members engaging said opposite edge, adjacent said end.

7. A knife handle of the class described adapted for use with a detachable blade having a forwardly projecting portion for reenforcing said blade; means on said forwardly projecting portion for engaging the upper edge of said blade, an engaging surface on said handle for engaging the opposite edge of said blade adjacent its butt, and means independent of said forward projecting portion engageable with the upper edge of said blade for normally resisting disengagement of the lower edge of said blade from said engaging surface.

In testimony whereof, I have signed the foregoing specification.

ELLSWORTH L. McCAIN.